US012609599B2

(12) United States Patent
Zhu et al.

(10) Patent No.: US 12,609,599 B2
(45) Date of Patent: Apr. 21, 2026

(54) VIBRATION EXCITER

(71) Applicant: AAC Microtech (Changzhou) Co., Ltd., Changzhou (CN)

(72) Inventors: Aijie Zhu, Changzhou (CN); Junsheng Wang, Changzhou (CN); Jie Wu, Changzhou (CN); Qiang Zhang, Changzhou (CN); Zixu Hua, Changzhou (CN); Yanxue Zhi, Changzhou (CN); Jie Liu, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 211 days.

(21) Appl. No.: 18/536,172

(22) Filed: Dec. 11, 2023

(65) Prior Publication Data

US 2024/0339906 A1 Oct. 10, 2024

Related U.S. Application Data

(63) Continuation of application No. PCT/CN2023/087342, filed on Apr. 10, 2023.

(51) Int. Cl.
*H02K 33/18* (2006.01)
(52) U.S. Cl.
CPC .................................... *H02K 33/18* (2013.01)

(58) Field of Classification Search
CPC ..................................................... H02K 33/18
See application file for complete search history.

(56) References Cited

U.S. PATENT DOCUMENTS

| | | | |
|---|---|---|---|
| 2011/0057367 A1* | 3/2011 | Hasegawa .............. | H02K 33/16 |
| | | | 267/140.14 |
| 2020/0044538 A1* | 2/2020 | Tang ..................... | H02K 33/18 |
| 2021/0408885 A1* | 12/2021 | Amin-Shahidi ....... | H02K 33/18 |

* cited by examiner

*Primary Examiner* — Viet P Nguyen
(74) *Attorney, Agent, or Firm* — Wiersch Law Group

(57) ABSTRACT

The present application provides a vibration exciter, which includes a casing with an accommodating space, a vibration unit suspended in the accommodating space, an elastic unit connected to the vibration unit and arranged in the accommodating space, and a drive unit fixed to the casing and configured to drive the vibration unit to vibrate. The vibration unit includes a mass block in a ring shape, a rubber coating member wrapped outside the mass block and internally form an installation cavity, a pole core combined with the rubber coating member and arranged inside the installation cavity, and a magnetic steel fixed on a side of the pole core away from the mass block. The drive unit is accommodated in the installation cavity. The vibration exciter of the present application can effectively reduce production costs and improve the fixation stability between the mass block, the magnetic steel and other components.

8 Claims, 5 Drawing Sheets

A-A

VIBRATION EXCITER

CROSS REFERENCE TO RELATED APPLICATIONS

The present disclosure is a continuation of PCT Patent Application No. PCT/CN2023/087342, entitled "VIBRATION EXCITER," filed Apr. 10, 2023, which is incorporated by reference herein in its entirety.

TECHNICAL FIELD

The embodiments of the present application relate to the technical field of sound devices, in particular to a vibration exciter.

BACKGROUND

With the development of electronic technology, portable consumer electronic products are increasingly sought after by people, such as mobile phones, handheld game consoles, navigation devices, or handheld multimedia entertainment devices. These electronic products cannot do without the application of sound devices, which generally involve a vibration exciter. In related technologies, a mass block configured to provide vibration on the vibration exciter is generally fixed by welding with components such as a pole core and a magnetic steel, resulting in multiple welding contact surfaces and high requirements for forming the mass block, thereby having high process costs.

SUMMARY

The objective of the present application is to provide a vibration exciter that can solve the problem of high process cost of the vibration exciter in related technologies.

The technical solutions of the present application are as follows. A vibration exciter is provided, and the vibration exciter includes a casing with an accommodating space, a vibration unit suspended in the accommodating space, an elastic unit connected to the vibration unit and arranged in the accommodating space, and a drive unit fixed to the casing and configured to drive the vibration unit to vibrate. The vibration unit includes a mass block in a ring shape, a rubber coating member wrapped outside the mass block and internally form an installation cavity, a pole core combined with the rubber coating member and arranged inside the installation cavity, and a magnetic steel fixed on a side of the pole core away from the mass block. The drive unit is accommodated in the installation cavity.

As an improvement, there is an elastic unit arranged on two opposite sides of the mass block, respectively, the elastic unit includes a spring bracket suspended in the accommodating space and a first fixing block fixed between an end of the spring bracket and a side wall of the casing, and the vibration unit further includes a second fixing block fixed between the other end of the spring bracket and the mass block.

As an improvement, the rubber coating member includes a first rubber coating portion wrapped around the mass block and a second rubber coating portion protruding over the first rubber coating portion, and the second rubber coating portion is wrapped outside the second fixing block and a corresponding end of the spring bracket.

As an improvement, the second fixing block is fixed on outside of the mass block and protrudes over the rubber coating member, and an outer end face of the second fixing block is welded and fixed to the elastic unit.

As an improvement, the installation cavity includes at least two sub cavities arranged sequentially and interconnected, the at least two sub cavities are formed within the rubber coating member, the pole core is fixed between two adjacent sub cavities in the at least two sub cavities, the magnetic steel is fixed on each inner wall of the at least two sub cavities, and the drive unit is arranged inside each of the at least two sub cavities.

As an improvement, the drive unit includes a frame fixed to the casing, a coil wound around the frame, and an FPC unit fixed to the casing and electrically connected to the coil, and there is a gap between the magnetic steel and the coil.

As an improvement, the rubber coating member is fixed to the pole core and the magnetic steel, respectively by adhesive curing or heat curing.

As an improvement, the installation cavity is provided with a positioning portion extending from a side wall to inside of the installation cavity, the positioning portion has a positioning notch, two opposite ends of the pole core protrude to form a positioning protrusion, respectively, and the positioning protrusion is arranged in a corresponding positioning gap.

As an improvement, two adjacent positioning portions are arranged at intervals to form a positioning groove, and the magnetic steel is arranged in the positioning groove.

As an improvement, a rubber accommodating groove is formed on a peripheral side of the second fixing block, and the rubber coating member is wrapped around an outer circumference of the second fixing block and filling in the rubber accommodating groove.

The advantageous effect of the present application is to wrap a layer of rubber coating member on outside of the mass block, and the pole core and the magnetic steel are inserted into the installation cavity formed by the rubber coating member inside the mass block, so that the mass block, the pole core, the magnetic steel, and other components can be combined into one by the rubber coating member. Compared to traditional fixing method, that is welding, the rubber coating member can provide a relatively higher stability and can effectively reduce production costs due to the lack of investment in welding and other equipment.

DETAILED DESCRIPTION

Figure 1:
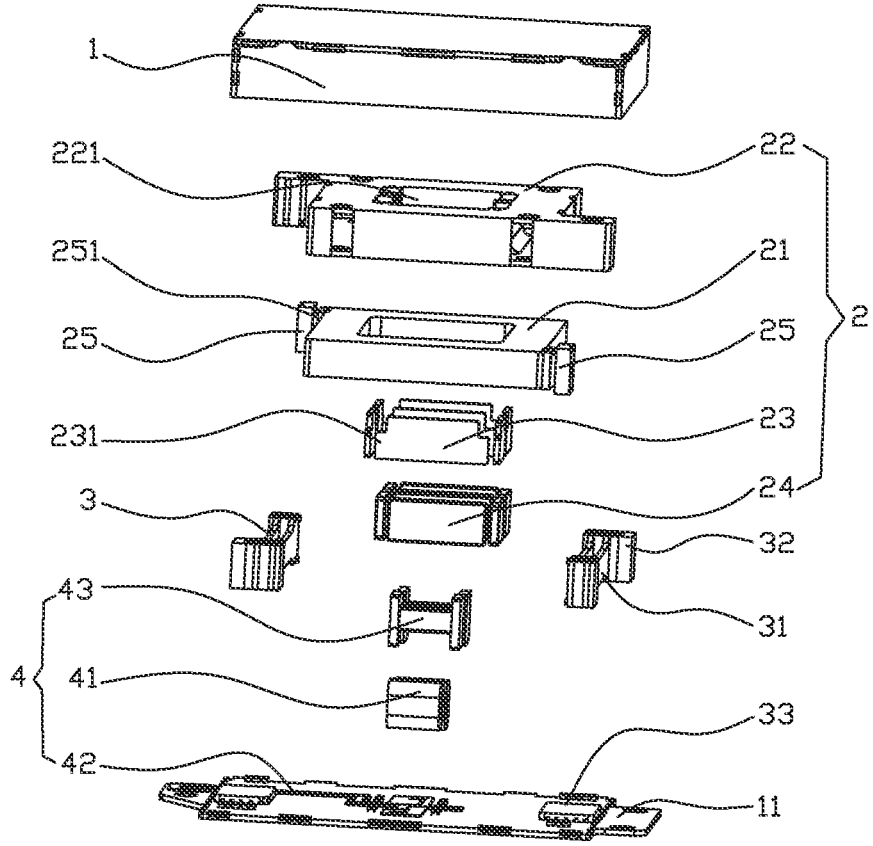
FIG. 1 is an explosive view of a vibration exciter provided according to the present application.

The present application will be further explained in conjunction with the accompanying drawings and embodiments. Examples of embodiments are shown in the accompanying drawings, where the same or similar reference signs throughout represent the same or similar components or components with the same or similar functions. The embodiments described below by referring to the accompanying drawings are exemplary and intended to explain the present application, but cannot be understood as limitations to the present application. Based on the embodiments in the present application, all other embodiments obtained by those of ordinary skills in the art without creative efforts shall fall within the scope of protection of the present application.

In the description of the present application, it should be understood that orientation or positional relationship indicated by the terms "center", "longitudinal", "transverse", "length", "width", "thickness", "up", "down", "front", "rear", "left", "right", "vertical", "horizontal", "top", "bottom", "inside", "outside", "clockwise", "counterclockwise", "axial", "circumferential", and "radial" are described based on the orientation or positional relationship shown in the accompanying drawings, and are only for the convenience of describing and simplifying the present application, rather than indicating or implying that the device or component referred to must have a specific orientation, or be constructed and operated in a specific orientation, and therefore cannot be understood as limitations to the present application.

In addition, the terms "first" and "second" are only used to describe the purpose and cannot be understood as indicating or implying relative importance or implying the quantity of technical features indicated. Therefore, features limited to "first" and "second" can explicitly or implicitly include one or more of these features. In the description of the present application, the meaning of "multiple" refers to two or more, unless otherwise specified.

Embodiments

As shown in FIG. 1 to FIG. 5, in this embodiment, the vibration exciter includes: a casing 1 with an accommodating space, a vibration unit 2 suspended in the accommodating space, an elastic unit 3 connected to the vibration unit 2 and arranged in the accommodating space, and a drive unit 4 fixed to the casing 1 and configured to drive the vibration unit 2 to vibrate. The vibration unit 2 includes a mass block 21 in a ring shape, a rubber coating member 22 wrapped outside the mass block 21 and internally form an installation cavity 221, a pole core 23 combined with the rubber coating member 22 and arranged inside the installation cavity 221, and a magnetic steel 24 fixed on a side of the pole core 23 away from the mass block 21. The drive unit 4 is accommodated in the installation cavity 221.

Specifically, a layer of rubber coating member 22 is wrapped on outside of the mass block 21, and the pole core 23 and the magnetic steel 24 are inserted into the installation cavity 221 formed by the rubber coating member 22 inside the mass block 21, so that the mass block 21, the pole core 23, the magnetic steel 24, and other components can be combined into one by the rubber coating member 22. Compared to traditional fixing method, that is welding, the rubber coating member 22 can provide a relatively higher stability and can effectively reduce production costs due to the lack of investment in welding and other equipment. In addition, in related technologies, Wu Ni Cu/316L materials are generally used to produce the mass block 21, which is expensive. In this embodiment, due to the stability between the mass block 21 and components such as the pole core 23 and the magnetic steel 24 being ensured by injection molding of the rubber coating member 22, welding is not required, and the producing requirements for the mass block 21 are greatly reduced. In this embodiment, low-cost sheet metal can be used for stamping processing, which can significantly reduce the cost for producing the mass block 21.

In this embodiment, there is an elastic unit 3 arranged on two opposite sides of the mass block 21, respectively, the elastic unit 3 includes a spring bracket 31 suspended in the accommodating space and a first fixing block 32 fixed between an end of the spring bracket 31 and a side wall of the casing 1, and the vibration unit 2 further includes a second fixing block 25 fixed between the other end of the spring bracket 31 and the mass block 21. A rubber accommodating groove 251 is formed on a peripheral side of the second fixing block 25, and the rubber coating member 22 is wrapped around an outer circumference of the second fixing block 25 and filling in the rubber accommodating groove 251, which is conducive to improving the bonding stability between the rubber coating member 22 and the second fixing block 25.

Specifically, the spring bracket 31 of this embodiment may be a long strip shaped elastic piece with wide ends and narrow middle. The spring bracket 31 on the same side of the mass block 21 may be one or multiple, preferably two. In this embodiment, a welding block is correspondingly arranged between the ends of two parallel spring brackets 31 on the same side, and the two spring brackets 31 on the same side are respectively welded and fixed with the welding block. A baffle 33 is arranged below the middle of the spring bracket 31, and the baffle 33 is fixed with a bottom casing 11 in the casing 1. The thickness of the baffle 33 is greater than the height between the middle of the spring bracket 31 and the bottom casing 11, and less than the height between the end of the spring bracket 31 and the bottom casing 11. The first fixing block 32 and the second fixing block 25 are arranged diagonally on the spring bracket 31, respectively, and the two second fixing blocks 25 connected on opposite sides of the mass block 21 are also arranged diagonally on the mass block 21. In this embodiment, the driving potential is generated by the drive unit 4, which causes the entire vibration unit 2 to vibrate back and forth in the direction from one of the two elastic unit 3 to the other elastic unit 3, so that sound is generated from vibration.

Figure 2:
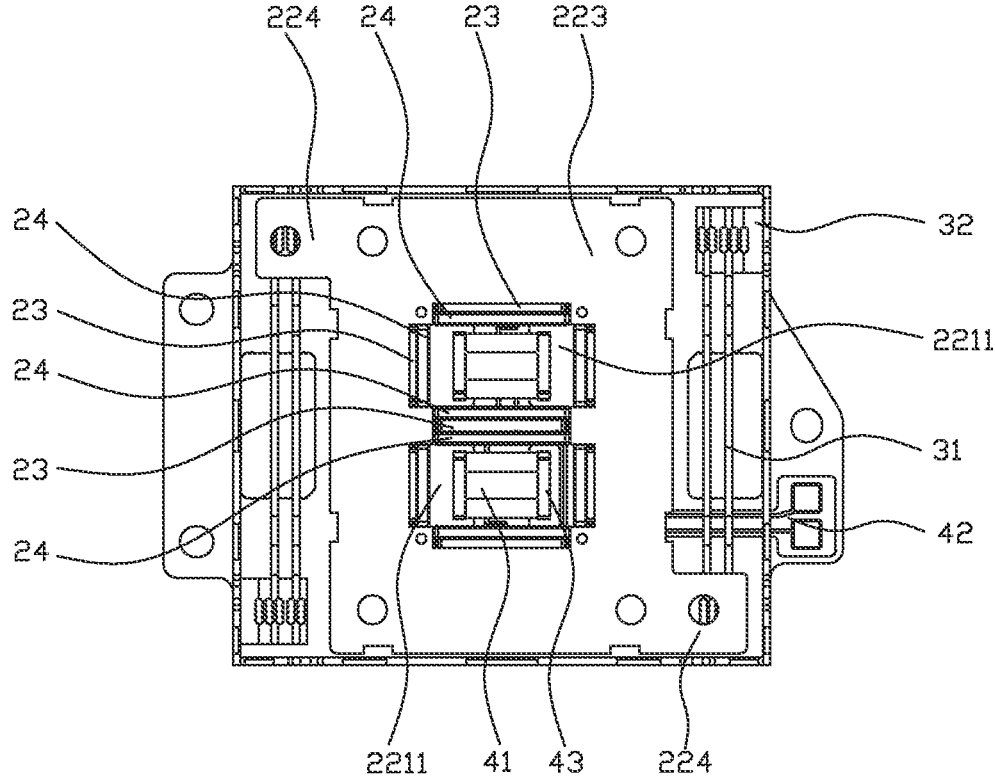
FIG. 2 is a partial schematic structural view of a vibration exciter provided according to an embodiment of the present application.

As shown in FIG. 1 and FIG. 2, in an implementation of this embodiment, the rubber coating member 22 includes a first rubber coating portion 223 wrapped around the mass block 21 and a second rubber coating portion 224 protruding over the first rubber coating portion 223, and the second rubber coating portion 224 is wrapped outside the second fixing block 25 and a corresponding end of the spring bracket 31. The rubber coating member 22 is configured to not only cover the outside of the mass block 21, but also cover the peripheral side of the second fixing block 25 and an end of the spring bracket 31 configured to connect with the second fixing block 25. Therefore, the mass block 21, the magnetic steel 24, the pole core 23, and the spring bracket 31 can be connected together by injection molding of the rubber coating member 22, so that the assembly and producing operation is simple.

Figure 3:
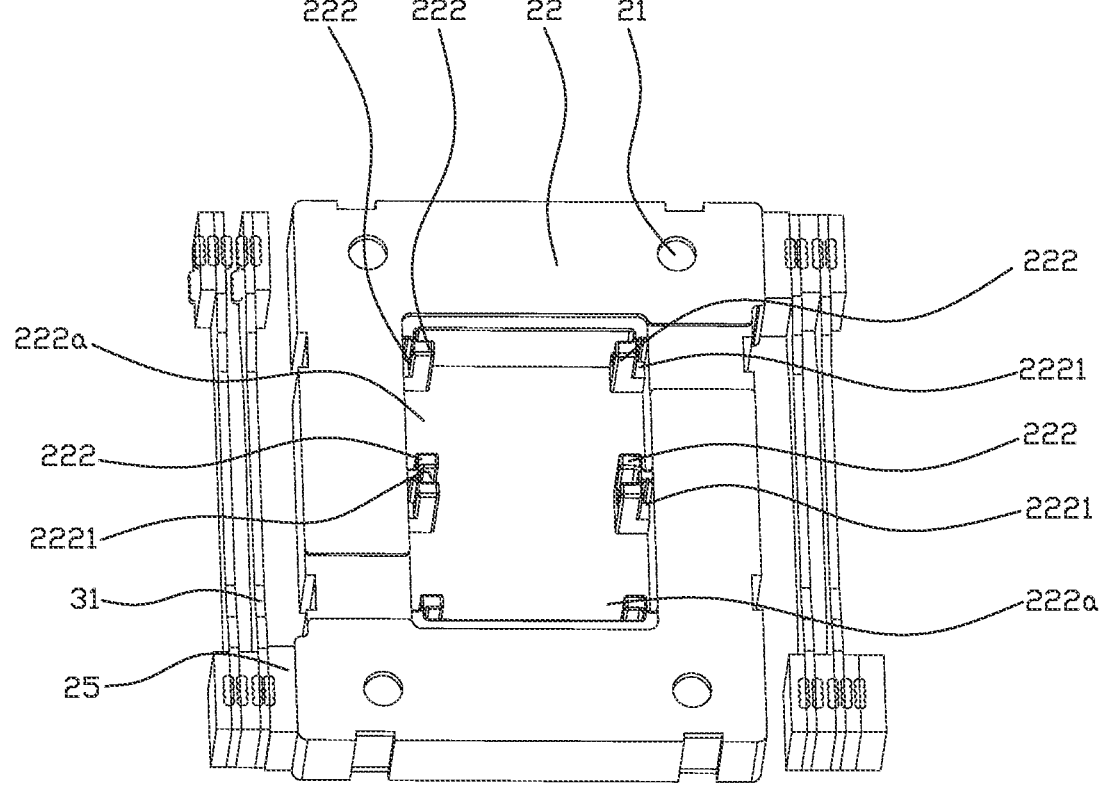
FIG. 3 is a partial schematic structural view of a vibration exciter provided according to another embodiment of the present application.
Figure 4:
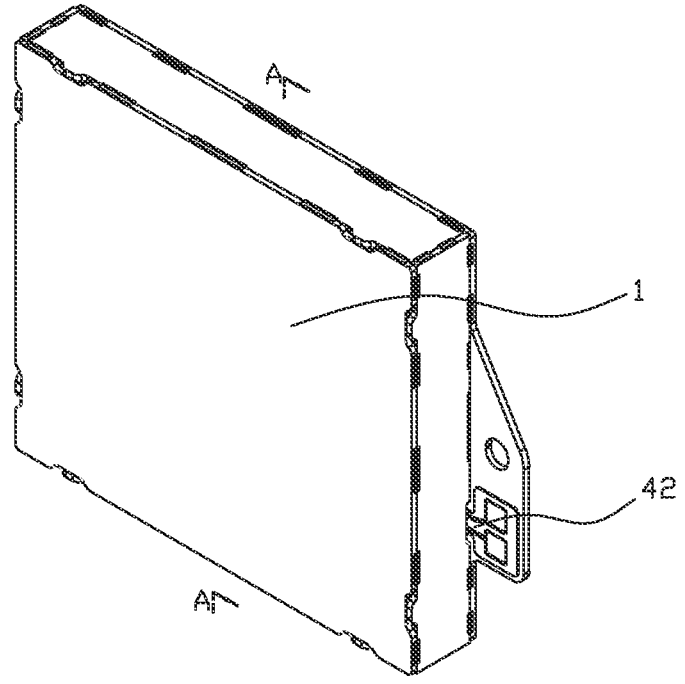
FIG. 4 is a schematic view showing an overall shape of a vibration exciter provided according to the present application.

As shown in FIG. 3, in another implementation of this embodiment, the second fixing block 25 is fixed on the outside of the mass block 21 and protrudes over the outside of the rubber coating member 22. An outer end face of the second fixing block 25 is welded and fixed with the elastic unit 3, that is, the mass block 21 is welded to the second fixing block 25, and the second fixing block 25 is welded to the spring bracket 31, which can also achieve stable connection between the elastic unit 3 and the vibration unit 2.

In this embodiment, the drive unit 4 includes a frame 43 fixed to the casing 1, a coil 41 wound around the frame 43, and an FPC unit 42 fixed to the casing 1 and electrically connected to the coil 41. There is a gap between the magnetic steel 24 and the coil 41. By generating alternating current through the coil 41, the alternating current cuts the magnetic induction line of the magnetic steel 24 to generate induced potential, which can drive the elastic unit 3 to move.

In this embodiment, the installation cavity 221 includes at least two sub cavities 2211 arranged sequentially and interconnected, the at least two sub cavities 2211 are formed within the rubber coating member 22, the pole core 23 is fixed between two adjacent sub cavities 2211 in the at least two sub cavities 2211, the magnetic steel 24 is fixed on each inner wall of the at least two sub cavities 2211, and the drive unit 4 is arranged inside each of the at least two sub cavities 2211.

Specifically, a multi-magnetic-circuit structure (e.g., a dual magnetic circuit structure, a triple magnetic circuit structure, etc.) is applicable to the embodiment of the present application. The number of coils 41 in different magnetic circuit structures corresponds to the number of sub cavities 2211. The dual magnetic circuit structure is shown as an example in the accompanying drawings, in which the coil 41 is fixed in each sub cavity 2211 through a frame 43, and a magnetic steel 24 is fixed on the side walls of each sub cavity 2211, so that the four sides of the coil 41 are surrounded by the magnetic steel 24. It can be understood that a single magnetic circuit structure is also applicable to this embodiment, in which a coil 41 is fixed inside the installation cavity 221, without the need to separate multiple sub cavities 2211. Only the fixed pole core 23 and magnetic steel 24 are fixed to the four side walls of the installation cavity 221.

In this embodiment, the rubber coating member 22 is fixed to the pole core 23 and the magnetic steel 24, respectively, by adhesive curing or ironing curing.

Specifically, in an implementation, after a pole core 23 and a corresponding magnetic steel 24 is bonded and fixed, the pole core 23 and the corresponding magnetic steel 24 can be inserted together into a corresponding position in the installation cavity 221, and then adhesive can be applied at the corresponding connection points between the pole core 23, the magnetic steel 24, and the rubber coating member 22. After curing, the required elastic component can be obtained. In another implementation, after the pole core 23 and magnetic steel 24 are inserted into the corresponding positions of the installation cavity 221, the rubber coating member 22 can be ironed to combine the pole core 23, the magnetic steel 24, and the rubber coating member 22 into one, and the required elastic component is obtained after curing. The above two implementations can be used to achieve mutual fixation between the mass block 21, the pole core 23, and the magnetic steel 24, which has high fixation stability and is conducive to improving product reliability. It can be understood that the pole core 23 and the corresponding magnetic steel 24 can be fixed to each other and then be inserted into the installation cavity 221, or the pole core 23 and the corresponding magnetic steel 24 can be inserted into the installation cavity 221, respectively, and the pole core 23 and the corresponding magnetic steel 24 are fixed.

Figure 5:
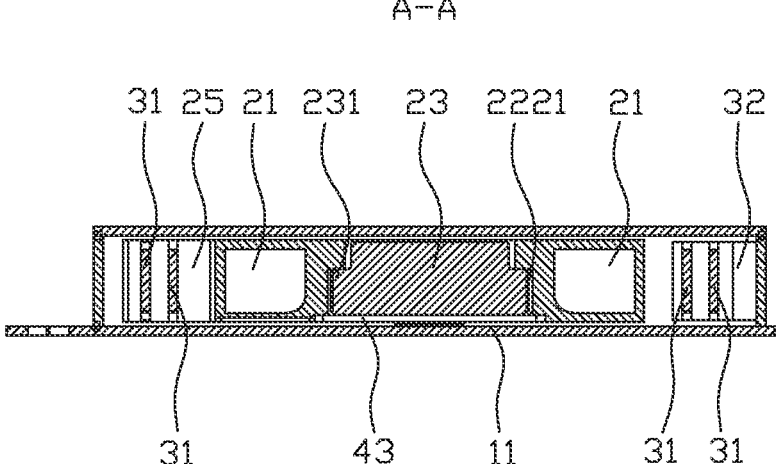
FIG. 5 is a cross-sectional view of a vibration exciter shown in FIG. 4 provided according to the present application along A-A.

As shown in FIG. 1, FIG. 3, and FIG. 5, in this embodiment, the installation cavity 221 is provided with a positioning portion 222 extending from a side wall to inside of the installation cavity 221, the positioning portion 222 has a positioning notch 2221, two opposite ends of the pole core 23 protrude to form a positioning protrusion 231, respectively, and the positioning protrusion 231 is arranged in a corresponding positioning gap 2221. Two adjacent positioning portions 222 are arranged at intervals to form a positioning groove 222a, and the magnetic steel 24 is arranged in the positioning groove 222a. That is to say, the shape of the positioning notch 2221 matches the shape of the positioning protrusion 231, and the shape of the positioning groove 222a matches the shape of the magnetic steel 24. During the process of inserting the pole core 23 and the magnetic steel 24 into the installation cavity 221 from the end where the positioning notch 2221 is located, a position where the magnetic steel 24 and the pole core 23 are fixed can be accurately positioned through the positioning groove 222a and the positioning notch 2221, which facilitates the subsequent adhesive applying or ironing fixation of the pole core 23, the magnetic steel 24, and the installation cavity 221.

The above are only the embodiments of the present application. It should be pointed out that for those of ordinary skill in the art, improvements may be made without departing from the inventive concept of the present application, and the improvements shall fall with the scope of protection of the present application.

What is claimed is:

1. A vibration exciter, comprising a casing with an accommodating space, a vibration unit suspended in the accommodating space, an elastic unit connected to the vibration unit and arranged in the accommodating space, and a drive unit fixed to the casing and configured to drive the vibration unit to vibrate, wherein the vibration unit comprises a mass block in a ring shape, a rubber coating member wrapped outside the mass block and internally form an installation cavity, a pole core combined with the rubber coating member and arranged inside the installation cavity, and a magnetic steel fixed on a side of the pole core away from the mass block, wherein the drive unit is accommodated in the installation cavity;

wherein there is an elastic unit arranged on two opposite sides of the mass block, respectively, the elastic unit comprises a spring bracket suspended in the accommodating space and a first fixing block fixed between an end of the spring bracket and a side wall of the casing, and the vibration unit further comprises a second fixing block fixed between the other end of the spring bracket and the mass block;

wherein the rubber coating member comprises a first rubber coating portion wrapped around the mass block and a second rubber coating portion protruding over the first rubber coating portion, and the second rubber coating portion is wrapped outside the second fixing block and a corresponding end of the spring bracket.

2. The vibration exciter according to claim 1, wherein the second fixing block is fixed on outside of the mass block and protrudes over the rubber coating member, and an outer end face of the second fixing block is welded and fixed to the elastic unit.

3. The vibration exciter according to claim 1, wherein the installation cavity comprises at least two sub cavities arranged sequentially and interconnected, the at least two sub cavities are formed within the rubber coating member, the pole core is fixed between two adjacent sub cavities in the at least two sub cavities, the magnetic steel is fixed on each inner wall of the at least two sub cavities, and the drive unit is arranged inside each of the at least two sub cavities.

4. The vibration exciter according to claim 3, wherein the drive unit comprises a frame fixed to the casing, a coil wound around the frame, and an FPC unit fixed to the casing and electrically connected to the coil, and there is a gap between the magnetic steel and the coil.

5. The vibration exciter according to claim 1, wherein the rubber coating member is fixed to the pole core and the magnetic steel, respectively by adhesive curing or heat curing.

6. The vibration exciter according to claim 1, wherein the installation cavity is provided with a positioning portion extending from a side wall to inside of the installation cavity, the positioning portion has a positioning notch, two opposite ends of the pole core protrude to form a positioning protrusion, respectively, and the positioning protrusion is arranged in a corresponding positioning gap.

7. The vibration exciter according to claim 6, wherein two adjacent positioning portions are arranged at intervals to form a positioning groove, and the magnetic steel is arranged in the positioning groove.

8. The vibration exciter according to claim 1, wherein a rubber accommodating groove is formed on a peripheral side of the second fixing block, and the rubber coating member is wrapped around an outer circumference of the second fixing block and filling in the rubber accommodating groove.

* * * * *